April 19, 1932. H. C. BARBOUR ET AL 1,854,325
GRAPPLE
Filed Nov. 15, 1930
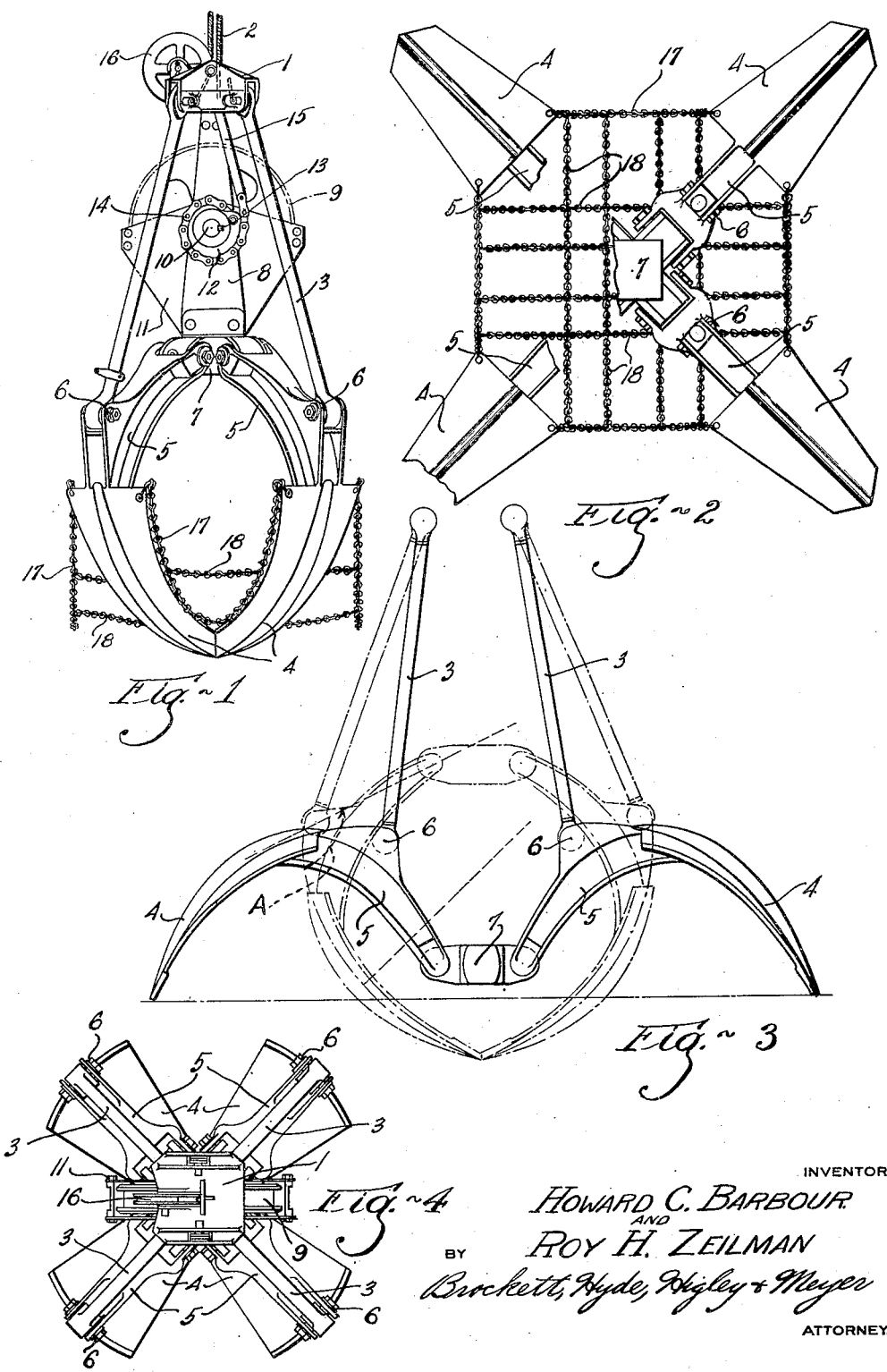
INVENTORS
HOWARD C. BARBOUR
AND
ROY H. ZEILMAN
BY
Brackett, Hyde, Higley & Meyer
ATTORNEYS Patented Apr. 19, 1932

1,854,325

UNITED STATES PATENT OFFICE

HOWARD C. BARBOUR AND ROY H. ZEILMAN, OF ELYRIA, OHIO, ASSIGNORS TO THE THEW SHOVEL COMPANY, OF LORAIN, OHIO, A CORPORATION OF OHIO

GRAPPLE

Application filed November 15, 1930. Serial No. 495,882.

Our invention relates to an improvement in grapples. It relates, particularly, to a grapple as shown and described in our co-pending application Serial No. 454,695, filed May 22, 1930 together with a means for binding or "tying in" a load held by the grapple.

The grapple in itself is of a type such that the blades will have a simultaneous raking and penetrating action during their movement to closed position and the angles between the blades and their supporting arms are obtuse whereby a greater distance between opening blade points may be secured.

It is the object of this invention to provide a means for binding or "tying in" a load held by the grapple in such manner that the load will be more securely retained by the grapple and this is obtained by the use of a net, preferably of chain, that bears against the top of the load.

Various other objects and advantageous features of our invention will be seen in the following description and one embodiment thereof may be seen in the accompanying drawings wherein similar characters of reference designate corresponding parts, and wherein:

Fig. 1 is a side elevation showing a grapple constructed in accordance with our invention; Fig. 2 is a plan view with parts broken away and showing the binding or "tying in" element applied to the grapple; Fig. 3 is a diagrammatic view showing the blades of the grapple in both open and closed position; and Fig. 4 is a top plan view of the device shown in Fig. 1.

Referring to the drawings, we have shown a grapple which comprises an upper head 1 to which a hoisting cable 2 is secured by means of a wedge or other suitable means, the cable serving as a means for raising, lowering, or moving the grapple to any desired position. A plurality of depending struts or rods 3 are disposed radially about the outer periphery of the upper head 1 and pivotally connected thereto. These rods serve to support a plurality of tapered blades 4 by being pivotally connected to blade supporting arms 5 as at 6. The blades are so shaped that there is an open space between the side edges of each adjacent pair of blades but the shape of the blades as to width is optional.

The inner ends of the blade supporting arms 5 are each connected to a lower member or a cross head 7 which is rigidly attached to the lower end of a frame 8, the pivot points between the arms and the lower cross head being substantially above the pivotal connection 6 between the blade supporting arms and the struts 3 when the grapple is closed. A grapple closing drum 9 is rotatably mounted in the frame 8 as shown in Fig. 1 by being rigidly mounted on a shaft 10 that is journalled in bearings in opposite sides of the frame 8 and a guide 11 is disposed about the major portion of the drum.

Cam-shaped spools 12 are rigidly mounted on opposing ends of the shaft 10 that extends outwardly from the opposing sides of the frame 8 by means of keys 13 or other suitable means. These cam-shaped spools have the ends of chains 14 rigidly attached thereto and pivotally attached to a link 15 at their opposing ends, which is, in turn, pivotally connected to the head 1. A chain or cable passes downwardly through the head 1 around a guide sheave 16 and thence around the drum 9, the free end of the cable being rigidly attached to the periphery of the drum in any well known manner.

In accordance with our invention, a net made up of a plurality of chains is provided on the grapple and consists of chains 17 connecting the adjacent upper corners of each pair of blades as shown in Fig. 2 and a plurality of cross chains 18 extending from each chain 17 to the opposite chain 17 connecting the adjacent upper corners of the oppositely disposed blades. Thus, a plurality of chains 18 extend at right angles to each other and cross each other to form a net.

In the operation of this device, when it is desired to cause the blades 4 to separate to full line position shown in Fig. 3, the cable traveling around the drum 9 is released so that the frame 8 with its composite parts including the lower member or cross head 7 will drop downwardly by its own weight whereby the inner ends of the supporting arms 5 will be moved downwardly, the arms rotated about their pivotal connection 6 with the struts or rods 3, and the points of the blades 4 moved outwardly to full line position as shown, the cable winding up on the drum 12 and the chains 14 unwinding from the cam-shaped spools 13. Reversely, the blades being in open position, to cause convergence of the blades, upward force is exerted on the cable traveling around the drum 9 whereby such cable will be unwound from the drum and the drum rotated thereby causing rotation of the cam-shaped spools 12 and the winding up of the chain 14 on the spools whereby the frame and composite parts including the lower member or cross head 7 will be moved upwardly until the upper end of the frame strikes the upper head 1 at which time the blades will be in closed position shown in Figs. 1 and 3.

As in the co-pending application hereinbefore mentioned, the blades 4 are so disposed relatively to their supporting arms 5 that the angle between the blades and the supporting arms is obtuse. That is, the pivot points between the blade supporting arms 5 and the cross head 7, when the blades are in closed position, are above the centers of curvature of the blades 4 which will produce obtuse angles at the inner section of lines drawn through the two pivot points of each supporting arm and continuation of the lines of curvature of the blades. This is clearly shown by the angle A in Fig. 3.

With this construction, movement of the points of the blades toward each other in closing of the grapple, will result in a penetrating action and then a raking movement of the blades. However, in closed position, the points of the blades are in a substantially lower plane than that which they occupy in open position. Also, the blade supporting arms are so rounded on their interior surface that the material being wracked inwardly by the converging movement of the blades will be rolled upwardly toward the top of the grapple.

Such upward movement of the material toward the top of the grapple will force the material into contact with the net made up of a plurality of chains as hereinbefore described and disposed at the top of the blades 4 whereby the material will be securely wedged between the net and the blades of the grapple. Thus, the material will be securely bound or "tied in" within the grapple.

The use of a net work of chain or a holding means as shown and described in this application embodies numerous advantageous features among which is the binding or "tying in" action of the material within the grapple thereby preventing any slippage of the material or loss thereof through the space between the adjacent side edges of each pair of blades. Thus, a large load may be picked up by the grapple and conveyed to various points under substantially any operating conditions without loss of the material. Of course, the chains going to make up the net are of such length as to permit free and complete opening of the grapple.

What we claim is:

1. A device of the character described comprising, in combination, a plurality of blades, supporting arms therefor, and means for causing movement of the blades to open and closed position, chains connecting the adjacent upper corners of the blades, and a plurality of chains extending transversely across the grapple and interconnecting oppositely disposed blade corner connecting chains together to form a net work of chain across the top of the grapple for providing a load holding means supplemental to the blades.

2. A device of the character described comprising, in combination, a plurality of blades, supporting arms therefor, and means for causing movement of the blades to open and closed position, chains connecting the adjacent upper corners of the blades, and a plurality of chains extending at right angles to each other and transversely across the grapple to interconnect oppositely disposed blade corner connecting chains together to form a net work of chain across the top of the grapple for providing a load holding means supplemental to the blades.

3. A device of the character described comprising, in combination, a plurality of blades, supporting arms therefor, and means for causing movement of the blades to open and closed position, a net work of chain connecting the uppermost edges of the blades together and extending transversely across the grapple to form a tying means for the top of a load picked up by the closing movement of said blades.

In testimony whereof we hereby affix our signatures.

HOWARD C. BARBOUR.
ROY H. ZEILMAN.